UNITED STATES PATENT OFFICE 2,644,823

CYCLIC FLUOROCARBON ETHERS

Edward A. Kauck, St. Paul, Minn., and Joseph H. Simons, Gainesville, Fla., assignors to Minnesota Mining & Manufacturing Company, St. Paul, Minn., a corporation of Delaware No Drawing. Application March 29, 1952, Serial No. 279,467

6 Claims. (Cl. 260—345.1)

This application is a continuation-in-part of our copending application S. N. 48,777, filed Sept. 10, 1948, and since issued as patent No. 2,594,272 on April 29, 1952.

This invention relates to our discovery of a group of fully-fluorinated oxygen-containing carbon compounds that are highly stable and inert liquids having boiling points within the range of approximately 50 to 150° C. and having a unique combination of physical properties.

These new compounds are saturated cyclic fluorocarbon ethers, containing one oxygen atom and from six to ten carbon atoms in the molecule. They may also be referred to as fully fluorinated cyclic alkylene oxides. They are structurally characterized by having a five-membered or a six-membered ring in the molecule, consisting of four or five fluorinated carbon atoms and one oxygen atom, and by having a fully fluorinated normal (straight chain) alkyl group bonded to a carbon atom of the ring that is adjacent to the oxygen atom.

These compounds are represented by the generic formula:

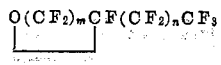

where $m$ has an integer value of 3 or 4; and $n$ has a value (zero or an integer) such that the total number of carbon atoms in the molecule is in the range of 6 to 10.

The compounds having a five-membered ring can be represented by the structural formula:

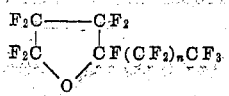

and the compounds having a six-membered ring by the formula:

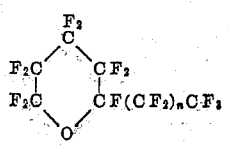

where $n$ has the meaning previously stated.

These two sub-series of compounds include corresponding isomeric compounds having the same number of carbon, fluorine and oxygen atoms—the isomeric pairs differing as to the ring structure (five-membered or six-membered) and the length of the side group, depending on whether a —$CF_2$— group is positioned in the ring or in the side group.

The isomers will in each case come within the following empirical (compositional) formula:

$$C_pF_{2p}$$

The pairs of isomers have the same $p$ value, which signifies the total number of carbon atoms in the molecule and has an integer value of 6 to 10.

For example, the following compounds are isomers:

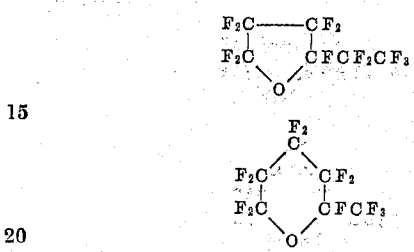

The grouping together of such isomeric pairs is warranted by the fact that they have substantially identical physical properties, the differences being so slight as to be of no moment in respect to practical uses of the compounds within physical properties are important. For such uses it is immaterial whether one or the other or a mixture of such isomers be employed. They are in fact so nearly identical in properties that it is impossible to determine by ordinary means whether a given material consists of one or the other of the isomeric forms or a mixture thereof.

These compounds have approximately the following properties and are designated by the empirical formulas so that each horizontal row applies to each of the isomeric forms and to mixtures thereof. The first data column gives the boiling point (at 740 mm.), the second the density (at 25° C.), and the third the refractive index (at 25° C.), viz.:

| Compounds | B. P. (° C.) | $d_4^{25}$ | $n_D^{25}$ |
|---|---|---|---|
| $C_6F_{12}O$ | 55 | 1.69 | 1.26 |
| $C_7F_{14}O$ | 80 | 1.73 | 1.27 |
| $C_8F_{16}O$ | 103 | 1.77 | 1.28 |
| $C_9F_{18}O$ | 123 | 1.80 | 1.28 |
| $C_{10}F_{20}O$ | 143 | 1.82 | 1.29 |

Although these compounds are termed cyclic fluorocarbon "ethers," in recognition of the skeletal carbon ring structure which includes an oxygen atom linking two carbon atoms, they have unique properties and are quite unlike the corresponding cyclic hydrocarbon ethers of conventional organic chemistry.

The present compounds are all water-insoluble, non-flammable, clear, colorless, odorless, limpid liquids at room temperature, and they have boiling points within the range of approximately 50 to 150° C. Thus they include high-boiling, low-volatility liquids, having boiling points above that of water.

They are further characterized by having high densities, low viscosities, low surface tensions, low freezing points, low dielectric constants, high electrical resistivities and low power factors. They are extremely stable and very inert at normal and elevated temperatures. They do not burn or react with oxygen; and they do not react with metallic sodium or potassium except at elevated temperatures. They are relatively insoluble in hydrocarbons. However, they are soluble in oxygenated organic solvents such as alcohols, ethers and ketones.

These compounds have a degree of thermal stability which is at least as high as that of the saturated straight-chain (normal) aliphatic fluorocarbon ethers of similar boiling point and number of carbon atoms, showing that the oxygen atom is strongly bonded to the carbon atoms in the ring structure. The aliphatic fluorocarbon ethers are described in the patent of one of us, J. H. Simons, No. 2,500,388 (March 14, 1950), issued on a copending application. The present compounds have lower molecular weights but nevertheless have slightly higher boiling points than the aliphatic fluorocarbon ethers containing the same number of carbon atoms, and the densities and refractive indices are materially higher.

These novel compounds have value for uses in which various of the above-mentioned characteristics are important. Thus they have value as nonflammable inert dielectric or insulating fluids for electrical devices, such as switches and transformers, and for radio-frequency and micro-wave equipment. They can be used as nonflammable inert high-density liquids for flotation of elements in mechanical devices. They can be blended with other inert fluorocarbon-type liquids to obtain intermediate physical properties, such as density values intermediate between those of the individual compounds that are blended. They can be used as nonflammable, inert, heat transfer media, hydraulic mechanism fluids, lubricants, diluents and reaction media for chemical reactions, and solvents.

The $C_8F_{16}O$ compounds, having the following isomeric structural formulas:

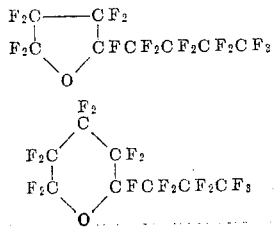

are of particular interest because of the combination of properties. In addition to those noted above, purified samples (prepared from caprylic acid by the electrochemical process hereinafter described and presumably comprising a mixture of these isomers) were found to have the following properties at 25° C.: a viscosity of 1.42 centipoises, a surface tension of 15.2 dynes/cm., a dielectric constant of 1.85 (measured at 100 cycles), a resistivity greater than $10^{17}$ ohms/cm.$^3$, and a dissipation factor and a power factor of less than 0.0001 (measured at 100 cycles). There is a change of only about 1% in the dielectric constant over the frequency range of 100 to $10^{10}$ cycles/sec. The freezing point is about −113° C. (glass point); and hence the liquid temperature range (between freezing and boiling) is about 216°.

The dielectric strength of a purified sample was measured and found to be 29 kilovolts (kv.) for a 25 mil gap. The test was made using ½" diameter Monel electrodes with a 0.025" gap. The D. C. voltage supply had a ripple of less than 1%. The starting voltage was 12 kv. and was raised at the rate of 200 volts/sec. until breakdown. The outstanding stability of this liquid material was demonstrated by subjecting it to repeated high-voltage breakdowns. It is much more stable than hydrocarbon liquids. The dielectric strength of purified carbon tetrachloride under the same test conditions was found to be 19 kv., and that of a commercial hydrocarbon transformer oil was 16–18 kv. The latter showed a substantial decrease in dielectric strength after 25 breakdowns and considerable carbon had formed; and a single breakdown caused the resistivity to decrease by a factor of a thousand.

*Preparation*

These compounds can be made by the electrochemical process broadly described and claimed in the patent of one of us, J. H. Simons, No. 2,519,983 (August 22, 1950), issued on a copending application.

Briefly stated, this process involves electrolyzing a solution of an appropriate organic starting compound dissolved in anhydrous liquid hydrogen fluoride. A nickel-anode iron-cathode cell can be used, operated at a temperature in the range of about 0 to 25° C. and at approximately atmospheric pressure. A cell voltage of approximately 5 to 6 volts is generally used. The operating voltage is not high enough to result in the formation of free (elemental) fluorine. The present compounds are relatively insoluble in the electrolyte solution and upon formation they settle to the bottom of the cell. They can be readily recovered from the cell drainings by fractional distillation.

In making the present compounds, use can be made as starting compounds of the corresponding hydrocarbon cyclic ethers (alkylene oxides) of corresponding carbon skeletal structures, the electrochemical process causing total replacement of the hydrogen atoms by fluorine atoms. Thus, for instance, 2-ethyl tetrahydrofuran and 2-methyl tetrahydropyran, can be converted to the corresponding fluorocarbon ether compounds, which are isomeric and both of which are represented by the same empirical formula: $C_6F_{12}O$. Unsaturated starting compounds can be employed, since the process causes fluorine addition to produce saturated products.

Another source of the present compounds is provided by the use of the aforesaid electrochemical process in the making of fluorocarbon acid fluorides by the electrolysis of solutions of liquid hydrogen fluoride and straight chain fatty acids which contain from six to ten carbon atoms in the molecule. This procedure for making fluorocarbon acid fluorides is described in a patent of which we are joint patentees with A. R. Diesslin, No. 2,567,011 (September 4, 1951), issued upon a copending application. It has been found that this process provides a substantial by-product yield (often approaching 40%) of the present cyclic fluorocarbon ether having the same number of carbon atoms as the fatty acid starting compound.

The following equation represents the idealized overall reaction yielding the acid fluorides:

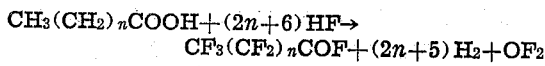

However, cyclization occurs in respect to many of the molecules present in the electrolyte, to produce the saturated six-membered-ring cyclic fluorocarbon ether:

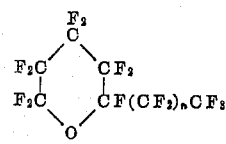

Cyclization also results in the formation of the isomeric five-membered-ring cyclic fluorocarbon ether. It is believed that the major yield is of the first-mentioned rather than the second-mentioned isomer. The cyclized product fraction may consist largely of the six-membered-ring isomer.

The formation of this type of structure (from fatty acid starting compounds containing six or more carbon atoms) is evidently due to the greater stability of the five-membered and six-membered rings as compared to rings containing more or less atoms. The terminal portion of the fluorocarbon chain is excluded from the ring but remains bonded to the carbon atom that unites with the oxygen atom.

The cell drainings comprise a mixture of the fluorocarbon acid fluoride and cyclic fluorocarbon ether reaction products, together with other by-products in minor proportion. The fluorocarbon acid fluoride and other water-soluble components are removed by washing the drainings with water and aqueous base. The water-insoluble fraction is then dried and subjected to fractional distillation to recover the desired cyclic fluorocarbon ether fraction. The latter can be further purified by treatment with silica gel or an ion exchange resin to eliminate ionizable fluoride contaminants (such as traces of HF).

Example

This experimental example serves to illustrate the electrochemical process when fatty acids are used as starting compounds.

An iron-cathode nickel-anode laboratory cell was used, which was of the type described in col. 9 of our aforesaid patent No. 2,567,011. It was loaded with 1,930 grams of anhydrous liquid HF and 80 grams of caproic acid, $CH_3(CH_2)_4COOH$. The concentration of the latter was maintained at approximately 4% during the run, HF and acid being added from time to time. The cell was operated at 5–6 volts and about 50 amperes. The cell temperature was about 20° C. and the pressure was essentially atmospheric. The duration of the run was 604 hours.

The liquid mixture that collected in the bottom of the cell was drained and was washed with water and aqueous base. The water-insoluble layer was dried and fractionated. From 3,100 grams of cell drainings, there was obtained 610 grams of the expected cyclic fluorocarbon ether compound, $C_6F_{12}O$, having a boiling point of 54–55° C. at 736 mm., and a molecular weight of 316 (determined from vapor density), in agreement with the calculated value of 316. The viscosity at 25° C. was 0.80 centipoises.

Other physical properties of this material have previously been mentioned and further data will be found in the subsequent table.

Identification was further substantiated by an examination of the mass spectrum of the electron-produced ionic fragmentation products, which clearly demonstrated the presence of an oxygen atom in the ring structure. The infra-red spectrum was obtained and did not exhibit bands characteristic of C=C, C=O, or C—H groups.

These facts, together with the high degree of stability and inertness of the compound, and the process of making, serve to exclude alternative hypotheses as to composition, and serve to identify it as being 2-trifluoromethyl nonafluoropentylene oxide:

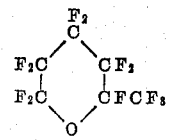

or an isomeric mixture of this isomer and the five-membered-ring isomer, 2-pentafluoroethyl heptafluorobutylene oxide:

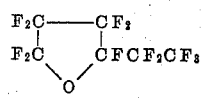

It is believed that the product fraction consisted mainly of the six-membered-ring compound.

In a similar way the previously mentioned higher cyclic fluorocarbon ethers of this invention can be recovered from the electrochemical treatment of the corresponding fatty acid starting compounds, viz.: Heptylic acid, $$CH_3(CH_2)_5COOH$$

yields the $C_7F_{14}O$ compound; caprylic acid, $$CH_3(CH_2)_6COOH$$

yields the $C_8F_{16}O$ compound; sebacic acid, $$CH_3(CH_2)_7COOH$$

yields the $C_9F_{18}O$ compound; and capric acid, $CH_3(CH_2)_8COOH$, yields the $C_{10}F_{20}O$ compound. In each case it is believed, as previously mentioned, that the cyclic ether product fraction consists mainly of the six-membered-ring isomer, the five-membered isomer being present in minor proportion.

The following table shows the measured properties of cyclic fluorocarbon ether fractions obtained by this method from fatty acid starting compounds, the boiling points being at 740 mm.

| Compounds | Mol. Wt. (found) | Mol. Wt. (calc.) | B. P. (° C.) | $d_4^{25}$ | $n_D^{25}$ |
|---|---|---|---|---|---|
| $C_6F_{12}O$ | 316 | 316 | 55 | 1.6857 | 1.2632 |
| $C_7F_{14}O$ | 369 | 366 | 78–80 | 1.7280 | 1.2704 |
| $C_8F_{16}O$ | 419 | 416 | 103 | 1.7663 | 1.2770 |
| $C_9F_{18}O$ | 467 | 466 | 121–123 | 1.7959 | 1.2822 |
| $C_{10}F_{20}O$ | 518 | 516 | 143–144 | 1.8210 | 1.2870 |

We claim:

1. The saturated cyclic fluorocarbon ethers represented by the formula:

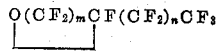

where $m$ has an integer value of 3 to 4, and $n$ has a value such that the total number of carbon atoms is an integer in the range of 6 to 10.

2. Compounds of the type specified in claim 1 which are represented by the empirical formula: $C_6F_{12}O$.

3. Compounds of the type specified in claim 1 which are represented by the empirical formula: $C_7F_{14}O$.

4. Compounds of the type specified in claim 1 which are represented by the empirical formula: $C_8F_{16}O$.

5. Compounds of the type specified in claim 1 which are represented by the empirical formula: $C_9F_{18}O$.

6. Compounds of the type specified in claim 1 which are represented by the empirical formula: $C_{10}F_{20}O$.

EDWARD A. KAUCK.
JOSEPH H. SIMONS.

References Cited in the file of this patent

UNITED STATES PATENTS

| Number | Name | Date |
|---|---|---|
| 2,459,892 | Chaney | Apr. 24, 1951 |
| 2,594,272 | Kauch et al. | Apr. 29, 1952 |